United States Patent [19]
Etzel et al.

[11] 3,791,807
[45] Feb. 12, 1974

[54] WASTE WATER RECLAMATION IN FIBER GLASS OPERATION

[75] Inventors: James E. Etzel, Lafayette; Clarence H. Helbing, Shelbyville; Carl A. Justus, Indianapolis, all of Ind.

[73] Assignee: Certain-teed Products Corporation, Valley Forge, Pa.

[22] Filed: May 2, 1972

[21] Appl. No.: 249,582

[52] U.S. Cl.............................. 65/3, 65/27, 134/13, 134/15, 162/199, 162/275, 210/54, 210/70
[51] Int. Cl............................................ C03c 25/02
[58] Field of Search.... 65/3, 27; 162/199, 274, 275; 134/15, 13; 210/49, 54, 73, 70, 196

[56] References Cited
UNITED STATES PATENTS
3,087,890   4/1963   Pye ................................... 210/54 X
3,356,565   12/1967   Smucker et al..................... 65/27 X

OTHER PUBLICATIONS
"Development and Operation of a Closed Wase Water System" Paper presented May 4, 1971 at Purdue Industrial Waste Conference, Purdue University.

Primary Examiner—Robert L. Lindsay, Jr.
Attorney, Agent, or Firm—Edward J. Sites

[57] ABSTRACT

A process is described for the utilization of waste waters typically encountered in the manufacture of fiber glass in which the waste water is treated both mechanically and chemically to remove solid materials contained in the waste water such as fiber glass, dust and other like materials. The waters are also chemically treated with high molecular weight cationic polymers to reduce substantially the phenolic resin content of the waters. Recirculation of various water streams for utilization in the fiber glass manufacturing process including utilization of treated waters in the manufacture of binder solutions is also described. The process is such that waste waters used in the manufacturing process can be totally reused thus requiring no disposal of waters to the environment.

5 Claims, 3 Drawing Figures

3,791,807

WASTE WATER RECLAMATION IN FIBER GLASS OPERATION

BACKGROUND OF THE INVENTION

For many years fiber glass manufacturing operations have encountered a serious problem in the disposal of waste waters which normally contain substantial quantities of phenolic resins. These phenolic resins present in waste waters are normally utilized as a binder material in the manufacture of glass fiber insulation products. In a typical operation for the manufacture of fiber glass insulation material the fiber glass is deposited on moving chain conveyors from air streams. Water solutions of phenolic resins are sprayed on the glass fibers as they are collected on the chain conveyors in the form of a glass mat and the mat containing the binder is then transferred to ovens where the binder system is dried and cured. This process is described in U.S. Pat. No. 3,215,585. As a result of the spraying of resin binder on the fiber glass, considerable quantities of the resin used deposit on the chain conveyor collection system itself and unless the deposit is continuously removed, the conveyors become fouled and inoperable due to the drying and curing of the resin on the metal chain or wire comprising the conveyor. Caustic soda baths and water sprays have been used conventionally to clean the chain conveyor used in the manufacture of fiber glass and the water resulting from this cleaning operation results in a waste water stream which contains considerable quantities of fiber glass and phenolic resin binder as well as caustic soda. Waters of this character, as will be readily appreciated by those skilled in the art, cannot be disposed of by recourse to conventional sewer systems since they represent a pollution hazard to the streams and lakes in which sewer systems are typically discharged.

Various systems have been proposed for solving this problem. Thus, in a paper presented at the Purdue Industrial Waste Conference on May 4, 1971, at Purdue University, West Lafayette, Indiana, one closed waste water system was described by Angelbeck, Reed and Thomas. Another system has been described for removal of impurities from fiber glass plant waste waters. This system is described in an article titled "A Solution to the Phenolic Pollution Problem in Fiber Glass Plants: A Progress Report" by J. M. Baloga, F. B. Hutto, Jr. and E. I. Merrill published in CHEMICAL ENGINEERING PROGRESS SYMPOSIUM SERIES, Water — 1969, No. 97, Vol. 65 at pages 124–127. While the two systems mentioned above are useful in reducing pollution hazards encountered in fiber glass manufacturing operations, further improvements can be made.

THE PRESENT INVENTION

In accordance with the present invention an improved treatment system for reclamation of waste waters encountered in manufacture of fiber glass insulation products of the above type is provided which involves treating these waters to remove substantially all solid materials. The waters are chemically treated to remove unusable phenolic resin binders so that the water can be reused for the manufacture of further quantities of phenolic binder and for the chain cleaning operation itself.

Thus in accordance with the present invention waste waters produced during the cleaning of chain conveyor systems is collected and screened to remove suspended solids. The screened water is then separated into a plurality of streams. One of the streams is recycled back to the spraying devices utilized to clean the chain devices while the second stream is discharged to a mixing tank in which the waste water containing both usable and unusable phenolic resin binder is treated with a high molecular weight cationic polymer to separate unusable phenolic resins from this waste water. The water resulting from this polymer treatment which is a mixture of water containing usable dissolved phenolic resin binder and coagulated unusable phenolic resin solids is then filtered to remove the coagulated unusable phenolic resin from the waste water. The water after filtration contains usable phenolic resin and is then recycled to a waste water reclamation tank where it is utilized as makeup water for the manufacture of further quantities of phenolic resin binder solution for utilization as binder in the fiber glass insulation manufacturing process. The treatment system is characteristically simple, compact, highly effective in recovering usable phenolic binder and completely closed so that all waste waters are recirculated in the plant, thus, requiring no water outfall from the waste water plant streams formed in cleaning.

For a more complete understanding of the instant invention reference is made to the accompanying drawings in which.

Figure 1:
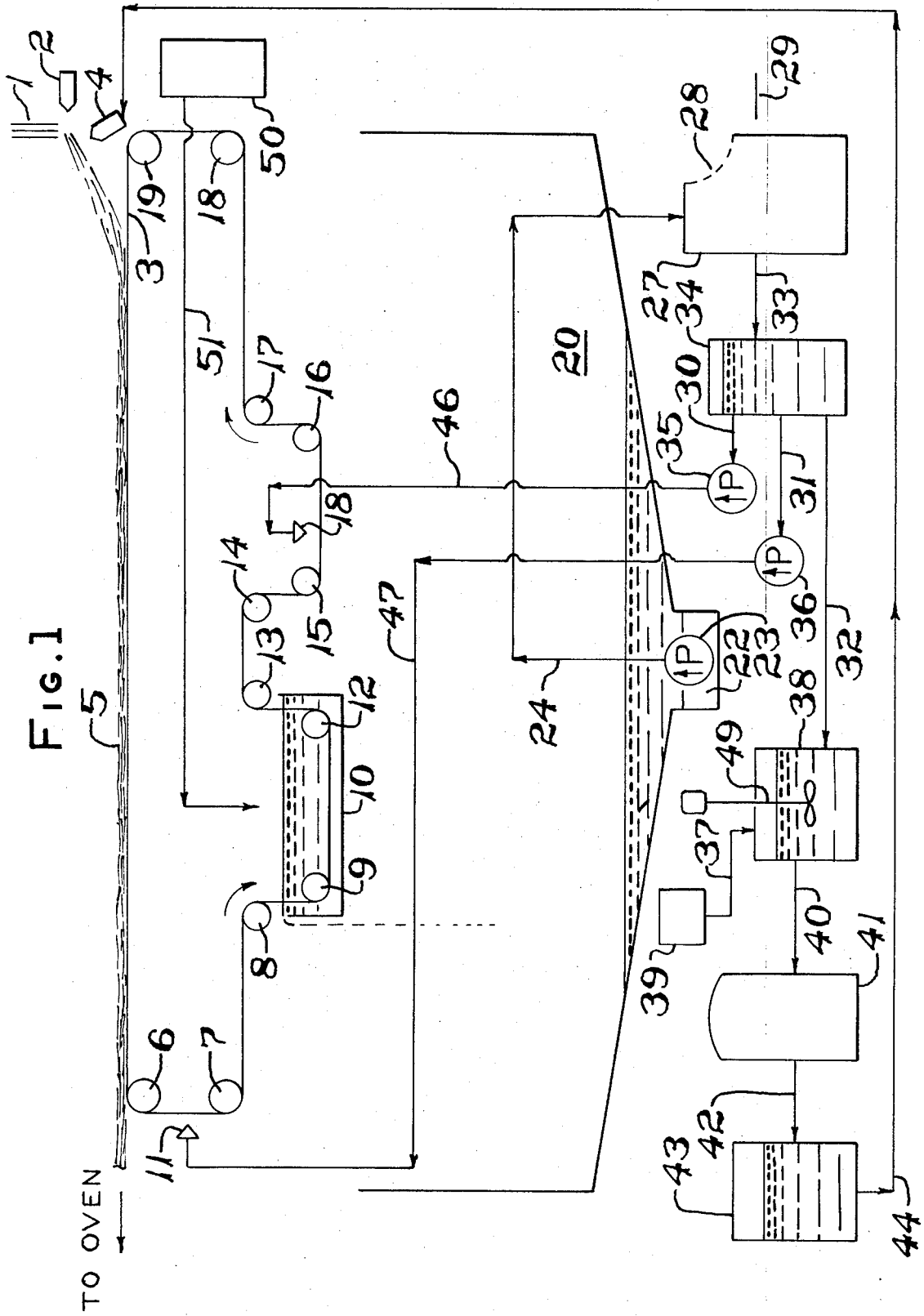
FIG. 1 shows generally the fiber glass forming operation and the waste water reclamation system of the instant invention.

Turning to the drawings, and FIG. 1 in particular, glass fiber threads 1 are shown being drawn into the face of a forced gas flame emanating from a burner 2. The fibers attenuated in the face of the flame are blown in short staple lengths onto a forming chain 3. Prior to their deposition on the surface of the forming chain 3 a phenolic type resin binder is applied from spray head 4 to the fibers. The mat 5 formed on the forming chain 3 is passed over a roller 6 to a suitable oven. The forming chain bends around the roller 6, passes over a series of rollers 7 and 8 and is admitted to tank 10 containing soft water. The chain 3 during its passage over the rollers to the tank 10 is sprayed with water from a spray 11. The chain passes through tank 10 over rollers 9 and 12 and then passes over rollers 13, 14, 15 and 16 and is subjected to high pressure water spray from spray device 18. The chain then passes over rollers 17, 18 and 19 and is returned to the mat forming area for the collection of further mat 5. All water introduced into the system onto the forming chain 3 via nip roll spray 11, soft water bath 10 and the high pressure spray 18 is collected in a large floor reservoir or sump generally indicated as 20. The reservoir 20 is provided in the central portion thereof with a ditch or sump 22. Located within sump 22 is pump 23. All water collected in the ditch or sump area 22 is pumped into a solids separation device 27 via line 24.

Solids are removed at the face 28 of separator 27 and flow onto a conveyor 29 for removal. Liquid from the solids-liquid separator is removed via line 33 and is passed to an effluent tank 34. The liquid material from tank 34 is removed in the preferred embodiment in three lines 30, 31 and 32. Lines 30 and 31 are connected to pumps 35 and 36 respectively. Line 32 feeds liquid from tank 34 to the liquid treatment tank 38. The tank 38 is provided with a line 37 running from a tank 39 to supply chemicals to tank 38 to treat the water contained therein.

The treated water from tank 38 is fed to filter 41 via line 40 and the filtrate is removed via line 42 and is fed to a binder mixing tank 43. Binder solutions from tank 43 are fed to spray 4 via line 44. Pump 35 feeds the water from line 30 via line 46 to the high pressure spray system 18 and pump 36 feeds water from line 31 via line 47 to the spray system 11. Makeup water to the system is supplied in the preferred embodiment from water softener 50 via line 51 to the tank 10.

Figure 2:
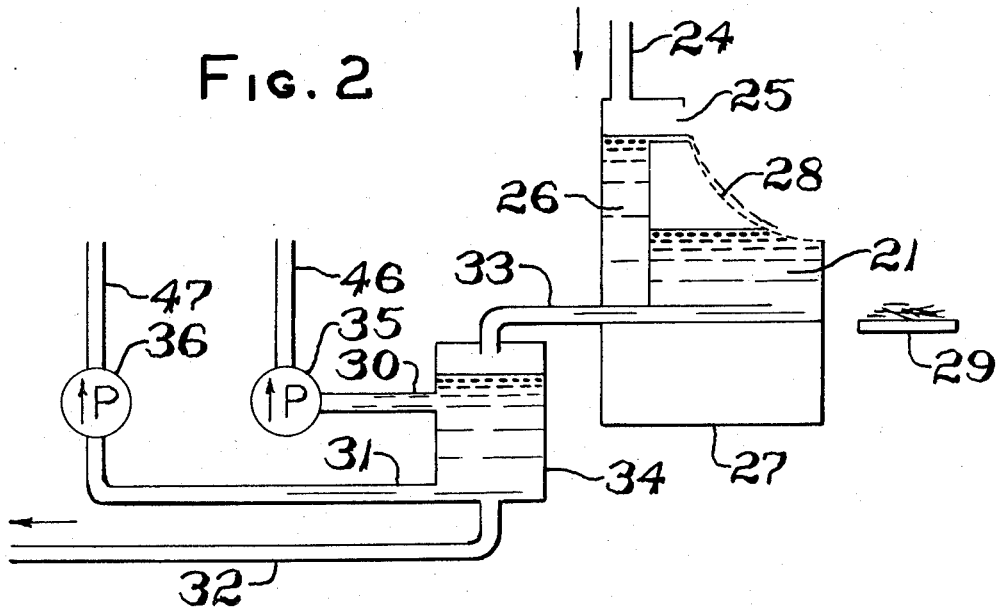
FIG. 2 is an enlarged view of the solids dewatering system.
Figure 3:
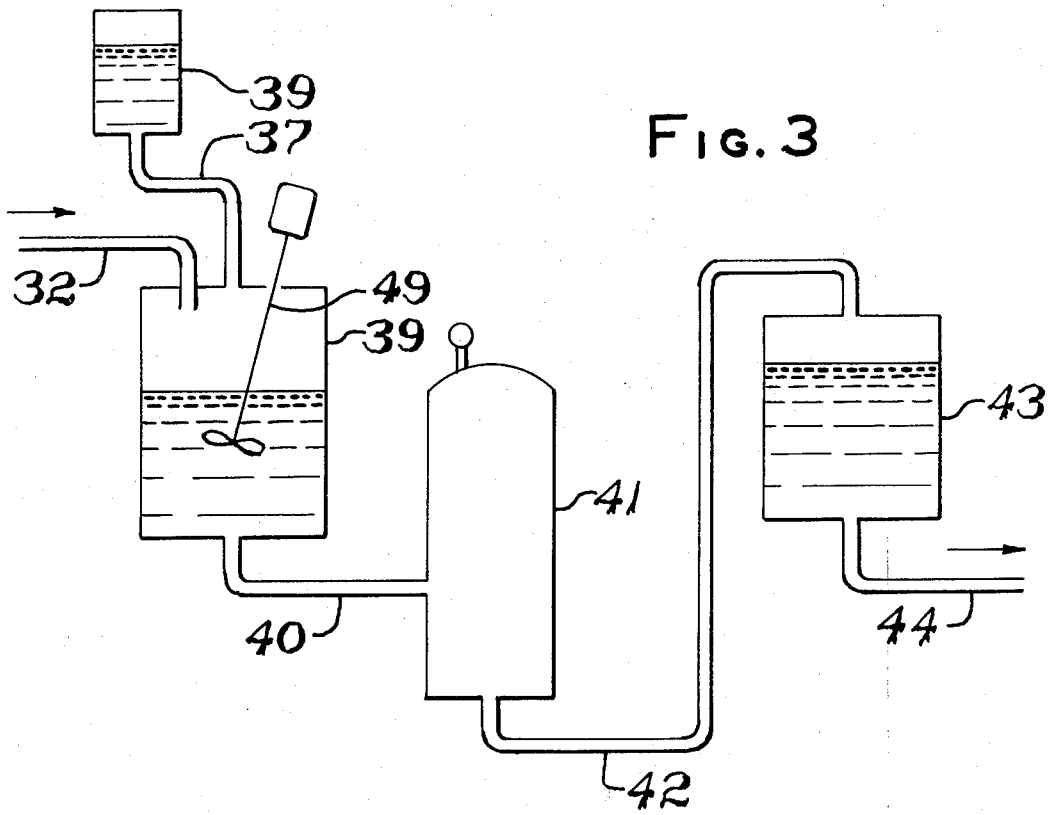
FIG. 3 is an enlarged view of the chemical reclamation system for treating water recovered from the solids dewatering system of FIG. 2.

Turning now to FIG. 2 which is an enlarged view of the preferred solids separator system, the material pumped from the concentrated ditch or sump pool 22 by pump 23 is passed via line 24 to the solids separator 27. In the preferred embodiment the separator 27 is a sieve device having positioned on a generally vertical face thereof a screened element 28. During the operation water is fed into a chamber 26 of separator 27 and overflows at lip 25. The solids and liquid pass down the face of the screen 28 and solid materials are removed from the face of the screen 28 and pass onto a dewatered solids collector 29. The liquid passes through the screen into a reservoir 21 and from there is passed via pipe 33 to a screened effluent tank 34. Thus three exit lines are preferably provided in the screened effluent tank 34. One effluent pipe 30 is connected to the high pressure spray system 18 via pump 35 and line 46 where it is utilized as wash water for the forming chain 3 in this portion of the process. A second feed line 31 is provided to feed water via pump 36 and line 47 to spray system 11 for utilization in cleaning the forming chain 3. A blow down line 32 is also provided in the screened effluent tank 34 which feeds the remainder of water to a coagulation tank 38 provided with a suitable mixer 49. Also entering the tank 38 as shown more clearly in FIG. 3 is a polymer supply line 37 from a supply tank 39. In the tank 38 a polymeric flocculant typically a cationic polymer is fed via line 37 and mixed thoroughly with the water from the blow down line 32 of the screened effluent tank 34. The material flocculated and agitated in the mixing tank 38, is then passed via line 40 to a paper or cloth media pressure filter 41. In the filter 41 the solid materials resulting from the flocculation occurring in the mixing tank 38 are removed and an essentially clean water stream is removed from the filter via line 42 and is passed to a binder mixing tank 43. In the mixing tank 43 the necessary ingredients for preparing binder are added and mixed and the resulting binder solution is fed to the spray head 4 of the fiber glass forming system shown in FIG. 1 via line 44.

As will be readily understood by those skilled in the art, the overall system utilizes essentially all of the water which is used in the cleaning of the fiber glass forming chains 3 used in the manufacture of the fiber glass product. This water is used as recycle water for cleaning purposes and the water from the chemical treatment area is utilized, after it has been filtered to remove the unusable phenolic binder, as makeup water for further binder solution manufacture. Makeup water is added to the system in tank 10 preferably.

In utilizing the instant invention it is of utmost importance that the water used in the bath 10 and in supplying makeup water to supply makeup water for the process be soft water. Soft water as used herein in the specification and claims means water that contains a hardness of 20 parts per million or less and preferably 10 parts per million or less measured as calcium carbonate. Makeup soft water may be added to the system in the sump 20, in the solids-liquid separator 27, in the screened effluent tank 34. Soft water can also be added if desired in the line 47 or in the high pressure spray lines 46. It is preferred in adding soft water as makeup to the system that it be added to the tank 10. It is believed that the use of soft water contributes significantly to the overall recovery of the usable phenol present in the system since it eliminates the formation of phenolic salts formed by the dissolved phenolic binder and the alkaline earth metal ions present in hard water. Elimination of this type of salt formation also reduces the quantities of polymeric additive that would be required to flocculate salts formed from alkaline earth metal ions in hard water and phenolic binder present in the waste waters encountered.

The polymeric materials utilized to coagulate unusable phenolic resin residues and fine solids contained in the water are fed via line 37 to the mixing tank 38 and are added to the mixer in quantities sufficient to provide on a weight basis 1 to 500 parts per million polymeric material in the mixing vessel, preferably 30 to 100 PPM basis the total contents of the tank 38. Typically the water solutions fed to the mixing vessel in line 42 are found to contain phenolic resin in quantities ranging on a weight basis of from about 400 to about 800 parts per million as undistilled phenol.

In the operation of the mixing vessel 38 it is preferred to provide proper coagulation of unusable phenolic binder present, that cationic polymeric materials be employed. Typically they are high molecular weight materials, i.e., having molecular weights in the range of from 500,000 to several millions. Typical cationic polymers suitable for this service are those described in U.S. Pat. Nos. 3,087,890 and 2,817,649. Mixing should be provided in this tank to insure adequate coagulation of the unusable phenolic material contained in the water present in the tank. Two particularly effective polymeric materials for utilization in the system of the instant invention are a high molecular weight polymeric coagulant, Aquafloc 418 manufactured by Dearborn Chemical Division, W. R. Grace Company under the trademark "AQUAFLOC" and Primafloc C-7, a high molecular weight polyamine bisulfate polymeric flocculant manufactured by the Rohm and Haas Company under the tradename "PRIMAFLOC C-7". The mixing vessel in which flocculation occurs is regulated during operation to provide therein a pH in the range of between 7 and 11, preferably between 7.5 and 8.5.

As previously mentioned, the solid-liquid separator 27 shown in FIG. 2 herein is the preferred solids-liquid separator for use in the process. This is a filter device manufactured by C. E. Bauer Division of Combustion Engineering Company under the tradename "HYDRASIEVE" ™. The device is described in U.S. Pat. No. 3,451,555 and 3,452,876. Essentially the device consists of a tank or reservoir 26 located at the top portion of the machine and into which the effluent containing solids is introduced via line 24. The liquid material fills the tank and flows by gravity over an opening 25 in the upper portion of the reservoir 26. The water containing solids passing through the opening flows down over the face 28 of separator 27 which consists of a plurality of screened bars which divides the flow of slurry into separate streams between vertical screen supports thereby preventing clogging or binding on the surface of the sieve or screen. The water passes through the openings of the sieve and is collected in chamber 21 from which it flows into the effluent pipe 33 while the solids roll down the face 28 of the sieve and are collected in the dewatered solids conveyor 29. While this device effectively removes solids from the system and represents the preferred method for separating solids from liquids in this portion of the process, recourse to other conventional liquid-solids separators can be had if desired. Thus, filter devices can be employed. Conventional screens can be utilized. Utilization of collection ponds utilizing filter beds and other similar liquid-solids mechanical separation devices can be used.

The flocculated material recovered from tank 38 in line 40 must be filtered to remove the material coagulated in that mixing vessel. In the preferred embodiment of the instant invention high pressure filters utilizing filter paper or filter cloth and preferably horizontal plate type filters are used. Thus, filters may be used with or without filter aids being added to the system. By high pressures is meant pressures on the order of from 30 to 110 p.s.i.g. and typically in the range of between 40 to 60 p.s.i.g. While pressure filtration forms the preferred embodiment, recourse to conventional atmospheric filters may be had where desired.

It is found in operating the system of the present invention that the phenolic content of the water found in the sump 20 generally ranges on a weight basis between 400 and 800 parts per million as undistilled phenol. Effluent from the mixing tank 38 in line 40 is found to contain on the same basis between 150 to 300 parts per million phenol. This phenol is in usable form and thus the water is readily available for utilization in the binder mixing operation. Since the phenol content is quite low but usable, the binder mixing operation can be adjusted to take into consideration the small quantity of usable phenolic resin present in the water.

The process will now be described with reference to FIG. 1 and a manufacturing operation in which five forming stations such as shown in FIG. 1 are employed, each of the forming stations having a chain conveyor 3, spray systems 11 and 18, a tank 10, feed lines 46, 47 and 51 and all of the water from each of the five stations being collected in the common sump 20 and central sump 22.

The fiber glass fibers 1 in each of the five stations are drawn in front of a hot gas pressure blast from a gas burner 2 where they are attenuated into short fine diameter lengths and are collected in each station on a chain 3. Fibers are sprayed in each station with a binder from one or more spray devices 4, the binder used being that described in U.S. Pat. No. 3,215,585. The mat 5 formed in each of the five stations passes to an oven (not shown) associated with each station. The chain 3 of each station passes over rollers 6, 7 and 8 located in each station to a cleaning tank 10 in each station through which it is passed by rollers 9 and 12, located in each tank 10. The chain 3 in each station then passes over rollers 13, 14, 15 and 16 in each station below a spray system 18 located in each station. The chain 3 in each station is then returned by rollers 17, 18 and 19 in each station to the mat forming area of each station for the collection of fibers 1 and preparation of mat 5 in each station.

Each tank 10 of each of the five stations during the passage of the chain 3 thereto, has continuously fed thereto soft water at the rate of 3 gallons per minute. Water overflows the top of tank 10 in each of the stations and the total water from each of the tanks 10 in each station is collected in sump 20 which is used as a common collector for all five stations. Chains 3 in each station have applied to them through the spray system 11 in each station, water at the rate of 36 gallons per minute. Also during their passage through each station each of the chains 3 have applied by the high pressure spray system 18 water at the rate of 116 gallons per minute. The water from both spray systems 11 and 18 in each of the five forming stations are also collected in the common sump 20 and flow to the central ditch or reservoir 22 therein.

The contents of the ditch 22 are continuously pumped via pump 23 to the solids-liquid separator 27 at the rate of 775 gallons per minute. The solids-liquid separator 27 is comprised of Hydrasieve $^{TM}$ units manufactured by the Bauer Brothers Company, a subsidiary of Combustion Engineering, Inc. Four of the units are Model 552–60 "and the fifth is Model 552–70". The 775 gallon flow of water is distributed to the five units on an approximate equal basis and water is removed from the solids-liquid separator system 27 at a rate of about 775 gallons per minute. This water is passed to the screened effluent tank 34 via line 33 from which it is removed in three lines 30, 31 and 32. The water is passed to line 30 at a rate of 580 gallons per minute and is delivered to a pump 35, one such pump being supplied for each forming station and the water in line 30 being equally divided among them. Each pump 35 in each station delivers water at the rate of 116 gallons per minute to a spray system 18 located in each of the five stations via a line 46 supplied in each station. The water in line 31 is passed at a rate of 180 gallons per minute to a pump 36, one such pump being supplied for each forming station and the water in line 31 being equally divided to each pump 36. Each pump 36 delivers water in a line 47 associated with each to a spray system 11 in each forming station at a rate of 36 gallons per minute.

Water from spray systems 11 and 18 clean the chain 3 before and after its immersion in tank 10 respectively. The overflow of water from each of the tanks 10 in each of the five forming stations is about 3 gallons per minute.

The water in line 32 is passed at a rate of 15 gallons per minute to the mixing tank 38. This tank is agitated by a motor driven mixer 49 and has added thereto a 1 percent solution of Primafloc C–7 to provide in tank 38 a concentration of Primafloc C–7 in the range of 30 to 100 parts per million. Water from tank 38 is passed to a filter system 41 operating at the rate of 15 gallons per minute. The filter system is a horizontal plate filter operating at 40 p.s.i.g. The water leaving the filter system 41 passes into tank 43 in line 42 at about 15 gallons per minute. The water in tank 43 is used to make up binder solution in accordance with the aforementioned U.S.

Pat. No. 3,215,585 and the binder solution is then fed via line 44 to spray 4 in each of the five forming stations.

Many modifications in the overall process described can be made without departing from the spirit of the invention. Thus, while tanks 10 filled with soft water are employed to soak the chain 3 in the preferred embodiment of the instant invention, it is not necessary that a tank be used for this purpose. If desired, in lieu of tank 10, one or more sprays can be used to clean the chain 10 utilizing a soft water spray. In controlling the soft water to insure the requisite degree of hardness in the soft water used it is preferred to operate the water softeners such that all water emanating from the softeners have a hardness of 20 parts per million or less as calcium carbonate. Thus, the softeners are controlled at this point so that when values in the soft water line from the water softeners exceed this value the softeners are regenerated in the conventional manner. In practice two or more water softeners are used so that should one require regeneration, another softener is available to deliver the requisite soft water while the other is being regenerated. Further, the process can also be applied to the rotary fiberization methods of manufacturing fiber glass such as described in U.S. Pat. No. 3,553,053 which also typically use phenolic binders and which possess chain conveyors which are cleaned after collection of mat thereon.

While the invention has been described with reference to certain specific embodiments, it is not intended that it be so limited except insofar as appears in the accompanying claims.

We claim:

1. A method of reclaiming waste water from a fiber glass manufacturing process comprising introducing water having a hardness of 20 parts per million or less measured as calcium carbonate onto the mat forming chains used to collect fiber glass having a phenolic binder thereon to thereby clean the mat forming chains, collecting all of the water used in cleaning in a sump, passing the collected water to a solids-liquid separation system, removing the suspended solids therefrom and producing a liquid stream having a substantially reduced solids content, feeding a portion of the liquid to the cleaning system to clean the mat forming chain, feeding a second portion of the liquid to a chemical treatment zone, adding a cationic polymer to the liquid in the chemical treatment zone, agitating the liquid in the chemical treatment zone to thereby form flocs of unusable phenolic binder, removing the liquid from said chemical treatment zone, filtering the liquid to remove suspended solids, and recovering the liquid from said filter and reusing said liquid as solution in the manufacture of binder for use in forming fiber glass on said mat chain.

2. In the manufacture of fiber glass wherein glass fibers are attenuated in the face of a gaseous high temperature blast, the fibers so attenuated are sprayed with a phenolic binder and collected on a forming chain in the form of a mat, the mat is cured in an oven and the chain is water cleaned before reuse the improvement comprising spraying the chain with water in a first zone, immersing the chain after spraying into a soft water tank, removing the chain from the soft water tank and subjecting it to a second spray of water, collecting water from both spray devices and overflow water from the immersion tank in a reservoir, passing water from the reservoir to a solids-liquid separation zone, screening the water therein to substantially reduce the solids contents of the water, passing the resulting water stream to a coagulation zone, adding a high molecular weight cationic polymer to the water in said coagulation zone to flocculate the unusable phenolic resin present therein, filtering the solution from the coagulation zone to remove the flocculants present, passing the resulting solution to a binder mixing tank for use in preparing further phenolic binder and reusing said solution in applying binder to fiber glass formed and collected on the forming chain.

3. A method of recovering waste water from a fiber glass manufacturing system wherein the waste water contains usable and unusable phenolic binder comprising passing the waste water to a solids-liquid separation zone, removing suspended solids from the water to produce a water stream having a substantially reduced solids content, feeding a portion of the resulting water stream to the fiber glass manufacturing system as cleaning water, feeding the remainder of the water to a chemical treatment zone, adding a high molecular weight cationic polymer to the water in said zone to flocculate the unusable phenolic binder present, filtering the flocculated material from the water to thereby recover from the filter a water stream containing usable phenolic binder and using this water to prepare phenolic binder solution for use in the said manufacturing operation.

4. In the manufacture of fiber glass insulation product wherein fibers are attenuated by hot gases, sprayed with a phenolic binder and collected on a mat forming chain, and wherein the chain is continuously cleaned with water to remove binder therefrom before reuse in collecting fibers the improvement comprising, subjecting the chain to a low pressure water spray, immersing the chain after said spray in a soft water bath having a continuous supply of soft water fed thereto, subjecting the chain to a second spray at high pressure and returning the chain to a forming area for the collection of glass fibers thereon, recovering the spent water from both spraying zones and overflow water from the immersion zone in a collection zone, feeding water from the collection zone to a solids-liquid separation zone, removing suspended solids from the water in the solids-liquid separation zone and passing a portion of the resulting water to the said high pressure spray and the said low pressure spray, passing the remaining portion of the water to a chemical treatment zone, treating the water in the chemical treatment zone with a high molecular weight cationic polymer to flocculate unusable phenolic binder content thereof, filtering the flocculant so produced from the water to recover water containing substantially all usable phenolic binder and utilizing this water to prepare phenolic binder for use in coating fiber glass during manufacture.

5. In the manufacture of fiber glass insulation product wherein glass fibers are coated with a phenolic binder and formed into a mat on a mat forming chain and wherein the chain is continuously cleaned with water to remove binder therefrom before reuse in collecting fibers the improvement comprising subjecting the chain to a soft water wash during the cleaning cycle, collecting all the waste water from the cleaning cycle, introducing the water collected to a liquid-solids separation zone, removing the solids from the water to produce a water stream having a substantially reduced solids content, using a portion of this stream in the cleaning cycle to wash the chain, feeding the remainder of the water to a chemical treatment zone, introducing a high molecular weight cationic polymer to said chemical treatment zone in a quantity sufficient to flocculate the unusable phenolic binder present in said water, filtering the resulting flocculated water to remove the flocs and introducing the resulting water stream to a binder mixing tank to provide water for the preparation of phenolic binder for the glass fiber manufacturing operation.

* * * * *